United States Patent
Richtsmeier

(10) Patent No.: US 6,282,835 B1
(45) Date of Patent: Sep. 4, 2001

(54) FLEXIBLE PLANT PROTECTOR WITH VERTICAL TUBES CONNECTED BY AN ANNULAR RING

(76) Inventor: Dean J. Richtsmeier, 7125 El Caballo Dr., Boise, ID (US) 83704

( * ) Notice: Subject to any disclaimer, the term of this patent is extended or adjusted under 35 U.S.C. 154(b) by 0 days.

(21) Appl. No.: 09/669,402

(22) Filed: Sep. 22, 2000

(51) Int. Cl.⁷ .................................................. A01G 13/00
(52) U.S. Cl. .............................................................. 47/26
(58) Field of Search .................... 47/30, 21, 26, 47/28.1, 32.1

(56) References Cited

U.S. PATENT DOCUMENTS

| 3,206,892 | * | 9/1965 | Telkes | 47/29 |
| 3,270,461 | * | 9/1966 | Fowler | 47/2 |
| 4,267,665 | | 5/1981 | Wallace et al. | 47/26 |
| 4,821,453 | | 4/1989 | Morehead | 47/2 |
| 5,509,229 | | 4/1996 | Thomasson et al. | 47/21 |
| 6,012,249 | | 1/2000 | Cheney | 47/26 |
| 6,108,970 | * | 8/2000 | Ball | 47/48.5 |

* cited by examiner

Primary Examiner—Charles T. Jordan
Assistant Examiner—Francis T. Palo
(74) Attorney, Agent, or Firm—Ken J. Pedersen; Barbara S. Pedersen

(57) ABSTRACT

This invention discloses generally enclosure structures for protecting plants. More specifically, this invention discloses a method and enclosure for thermally protecting plants from extreme temperatures and physically protecting plants from wind and other physical assaults. The present invention provides plants with a flexible yet stable fluid fillable enclosure formed by a plurality of vertical tubes interconnected by a basal annular ring.

9 Claims, 2 Drawing Sheets

FLEXIBLE PLANT PROTECTOR WITH VERTICAL TUBES CONNECTED BY AN ANNULAR RING

BACKGROUND OF THE INVENTION

1. Field of the Invention.

This invention relates generally to enclosure structures for protecting plants. More specifically, this invention relates to a method and means for thermally protecting plants from extreme temperatures and physically protecting plants from wind and other physical assaults. The present invention provides plants with a flexible yet stable fluid fillable enclosure formed by a plurality of vertical tubes interconnected by a basal annular ring.

2. Description of the Prior Art.

U.S. Pat. No. 4,267,665 (Wallace et al.) discloses thermal protective coverings for plants consisting of a double walled insulative device closable at the top and adapted to fit about the plant wherein the insulative space within the walls is filled with water. The device disclosed in the '665 patent, however, lacks radial stability, and may damage the plant when exposed to external stress. The device is difficult to use in that a separate, internal structural support, such as a five gallon drum, must be used during filling to keep the device from collapsing onto the plant. The device requires additional staking or anchoring to support the structure in a manner sufficient to keep the device from damaging the plant. Furthermore, the device disclosed in the '665 patent may not be closed at the top without the use of a string or tie of some sort.

U.S. Pat. No. 4,821,453 (Morehead) discloses a rigid, conical, transparent plant protector that is adapted to contain a fluid that may absorb thermal energy from an outside source and may release that absorbed thermal energy at another time. The '453 patent discloses a rigid device which overcomes the dimensional stability shortcomings of the previously discussed '665 patent. However, there is a need for a lightweight, flexible plant protector made from low cost material which exhibits the dimensional stability of the Morehead device.

U.S. Pat. No. 5,509,229 (Thomasson et al.) discloses a self supporting plant enclosure including a plurality of elongated hollow closure bodies each having a pair of outer and inner transparent walls. Each closure body is closed along the opposite sides and base and is open at least through a portion of the top, defining an internal cavity in the closure body capable of receiving and holding a quantity of fluid therein. The closure bodies are positioned in side-by-side relation and are coupled one closure body to the next along the opposite sides thereof so as to form the plant enclosure. Like the Morehead device, the plant protector disclosed in Thomasson is comprised of rigid material.

U.S. Pat. No. 6,012,249 (Cheney) discloses an insulated plant cover having a transparent or translucent inner cylinder which has a top and a bottom. The inner cylinder top has a chimney. The inner cylinder also has a bottom spacer positioned circumferentially along the bottom end of the inner cylinder. The disclosed plant cover also has a transparent or translucent outer cylinder. Fluid may be held in the concentric shell formed between the inner and outer cylinders. Once again, the Cheney device is rigid.

Still, there is a need for a lightweight, flexible plant protector made from low cost material which exhibits superior dimensional stability. Further, there is a need for such a plant protector which has the requisite stability to obviate the need for stakes or other anchors. Additionally, said device should be self closing without the aid of a string or tie. Finally said device must be easily filled with fluid and easily transported from one plant to another.

SUMMARY OF THE INVENTION

The invention is a flexible plant protector with vertical tubes connected by an annular ring. The tubes may be filled with water or other fluids in order to protect the plant from damaging hot or cold temperatures. The invention effectively extends the growing period of plants by artificially creating warmer days and warm nights in the plants' immediate environment, thereby triggering the plants to begin the growing season at a date earlier than the plants would otherwise begin their growing season. The present invention also provides plants with a physical barrier which protects the plants from wind, animals, and other mechanical stresses.

Since the dawn of agriculture, humans have struggled with the effects of weather. The interaction of weather and living systems is a basic aspect of agriculture. Although great strides in technology have resulted in massive production increases and improved quality, weather remains the limiting factor. One weather characteristic of agricultural value is the degree day. This concept holds that the growth of a plant is dependent on the total amount of heat to which it is subjected during its lifetime, accumulated as degree days. Common practice is to use 50° F. (10° C.) as a base. Thus, if the mean daily temperature for a particular day is 60° F. (16° C.), then 10 degree days are accumulated for that day on the Fahrenheit scale. The total number of growing degree days required form maturity varies with crop variety as well as plant species. Also, the minimum threshold temperature (the temperature below which the plant is damaged or unable to grow) varies with plants; e.g., 40° F. (4° C.) for peas, 50° F. (10° C.) for corn, and 55° F. (13° C.) for citrus. The present invention effectively increases the number of growing degree days for each plant protected by raising the mean daily temperature for each plant. The present invention also keeps the plants from being exposed to temperatures below the minimum threshold temperature early in the season when temperatures are otherwise below that in which the plants are able to grow.

The present invention creates an environment which provides plants with certain advantages with respect to the interaction between weather and agriculture. The essence of the weather-agriculture interaction lies in wise adaptation of agricultural operations to the local climate and in techniques for manipulating or modifying the local environment to minimize weather stresses on plants. Regardless of how favorable light and moisture conditions may be, plant growth ceases when the air and leaf temperature drops below a certain minimum or exceeds a certain maximum value. Between these limits, there is an optimum temperature at which growth proceeds with greatest rapidity. These three temperature points are the cardinal temperatures for a given plant; the cardinal temperatures are known for most plant species, at least approximately. The present invention affords the user a method and apparatus for keeping plants at or near the optimal temperature.

Another aspect of temperature control is frost protection. Likelihood of damage from freezing temperature depends upon the plant species, the season, the manner of temperature change, the physiological state of the plant, and other factors. Two types of frost are recognized: (1) radiation frost, which occurs on clear nights with little or no wind, and (2)

wind, or advection, frost, which occurs at any time, day or night, regardless of cloud cover. The present invention protects plants form both types of frost by (1) leaning the tops of the tubes inward to form a closed, inverted conical structure over the plant to reduce radiational cooling, and (2) forming a physical barrier around the plant reducing wind exposure. The present invention, when surrounding the plant and filled with water, will protect plants even if the water freezes. Since water releases its latent heat of fusion upon freezing, the plant is protected from unusually cold temperature. It is important that the present invention be made of a flexible material, such as a thermoplastic material, so that it may expand to accommodate the increased volume of frozen water.

There are additional advantages offered by the present invention with respect to wind remediation. Wind effects plant growth in other ways, including transpiration and mechanical breakage. Transpiration (the loss of water mainly through the stomata of leaves) increases with wind speed. In arid climates, dry and hot winds often cause rapid, harmful wilting. The effects of mechanical wind damage vary from species to species; some show a definite decrease in production with increasing wind, while others (usually short plants) are unaffected. Because of the long felt need, various shelters and plant protectors have been used to protect crops and increase yields. Crops that benefit most from wind protection include lentils, potatoes, tomatoes, cucumbers, beets, strawberries, watermelons, deciduous and citrus fruits, and other tender crops. By providing plants with a physical barrier to wind, the present invention largely eliminates damaging transpiration and mechanical damage due to wind.

Various types of devices may be used which fall within the scope of the invention. A preferred embodiment of the invention is most easily described in the following way: The plant protector is formed by folding in half a single-layered, rectangular, lightweight, durable, yet flexible material (such as a thermoplastic material), such that the resulting rectangle consists of two layers having the same width as the original rectangle, and a height equal to one half of the original rectangle. The base of the device is defined as the edge of the rectangle formed by the above described fold. The resulting two-layered rectangle has a base (defined as the length along which the fold is made), a top, a left side, and a right side. Seals are placed at specified positions on the material to join the two layers together to from vertical tubes. Seals are also strategically placed so as to provide stress relief sufficient to allow the material to withstand the stress applied when the device is filled with fluid. The seals do not extend to the base of the device, thereby forming an annular ring at the base of the device in fluid communication with each of the vertical tubes. The top of the device remains open so as to accept the introduction of fluids. The plant protector is formed by joining the left and right sides of the two-layered rectangle to form a tube.

The plant protector is then placed around a plant with the basal annular ring resting on the ground, and the vertical tubes forming a vertical, tubular enclosure around the plant. The device is filled with a fluid, such as water, by introducing water into just one of the vertical tubes. Because the annular ring located at the base of the plant protector interconnects all of the vertical tubes, all of the tubes will be filled to the same level. By filling the tubes to a level more than two-thirds full, the plant protector forms a stable, self-supporting structure which automatically remains open at the top. The filled basal annular ring provides the plant protector with improved radial stability, thereby preventing the vertical tubes from collapsing onto the plant. To protect the plant when the weather is very cold, the vertical tubes are only filled two-thirds full. By only filling two-thirds full, the vertical tubes may be pushed inward to form a cone enclosed above the plant. No strings or ties of any kind are needed to maintain the closed disposition of the partially filled tubes, once moved to a closed position. The closed cone configuration provides the plant with additional thermal protection by maintaining the air immediately around the plant at a desired temperature and reducing radiational cooling.

The basal annular ring of the present invention improves upon the stability of prior plant protectors by increasing radial stability. The prior flexible plant protectors tend to collapse onto the plant during filling. The present invention maintains radial stability as a result of the novel annular ring at the base of the device. It is important to locate the seals of the instant device properly to maximize stability and usability. It has been found through experimentation that the following locations of tube forming seals and stress relief seals result in a light-weight, flexible structure that is remarkably stable and easy to use. The vertical seals which form the vertical tubes of the present invention begin just below the top of the device. This allows the user to easily open the top of one to the tubes in order to introduce a chosen fluid. The top end of one layer of the material used to form the device may be cut away above the tube forming seals, thereby increasing the ease of opening a vertical tube. It is also envisioned that the seals may be spaced in such a way so as to create one vertical tube which is larger than the remaining tubes. The larger tube may be used to fill the device with a fluid, thereby allowing faster filling. As noted, the vertical seals do not extend to the base of the device, but extend only to the top of the basal annular ring. Stress relief seals are placed at the bottom of each of the vertical seals to increase the strength and durability of the device as well as the ability of the device to withstand the stress applied when filled with fluid. Stress relief seals are also strategically placed at the center of the base of each of the vertical tubes. Placement of the seals is critical as it allows the basal annulus to form when filled with fluid in such a way as to result in a configuration whereby the inner diameter of the basal annulus is equal to the outer diameter of the large vertical tube formed by the plurality of vertical tubes. When filled with fluid, the basal annulus spreads radially and pulls open the base of the large vertical tube forming an inverted conical frustum. As such, radial stability is maximized.

It is an object of the present invention to improve upon the prior art by providing a flexible, lightweight, low cost plant protector with improved stability. By forming the basal annular ring as described above, an improved plant protector made from flexible, lightweight, low cost material, such as low density polyethylene, is provided which exhibits enhanced stability. The enhanced stability of the instant device eliminates the need found in the prior art for additional structural support during filling. Nor does the novel stable device need any additional anchoring means, such as a stake or the like, to hold it in place once filled.

It is a further object of the present invention to improve upon the prior art by providing a self supporting structure with enhanced stability allowing for ease of transport of the device when filled with a fluid. By strategically placing the stress relief seals of the instant device, the basal annular ring provides unexpectedly enhanced stability. The present invention provides thermal and wind protection by enclosing the plant within fluid filled or partially filled tubes anchored by a fluid filled basal annular ring. In addition to maximizing radial stability, the basal annular ring also anchors the plant protector in place, obviating the need for stakes or other anchors found in the prior art.

The novel combination of vertical tubes interconnected by a fluid filled basal annular ring also provides a plant protector that can be opened or closed on the top. It is a further object of the present invention to improve upon the prior art by providing a structure which remains closed at the top without the aid of additional strings or ties. As described above, the present device remains closed when the vertical tubes are only two-thirds filled and then pushed inward. The vertical tubes automatically remain open when filled beyond two-thirds full with fluid.

The key to the instant invention is the basal annular ring which connects the plurality of vertical tubes. By adroitly choosing the position of the stress relief seals, the fluid-filled basal annular ring forms in such a way so as to maximize stability of the instant device. As a result, the shortcomings of the prior art are substantially overcome. The unique combination of vertical tubes interconnected by a fluid filled basal annular ring creates a plant protector which is durable, yet flexible and lightweight. The instant device is also free standing and stable both radially and laterally due to the unique attributes of the annular ring.

BRIEF DESCRIPTION OF THE DRAWINGS

In the following detailed description, reference will be made to the attached drawings in which.

DETAILED DESCRIPTION OF THE PREFERRED EMBODIMENTS

Plant protectors providing thermal and physical protection from extreme temperature, wind, animals, and the like are well known in the art. Heretofore, however, there has been a need for a self supporting, yet flexible structure which is both lightweight and sufficiently stable. There has also been a need for a plant protector which may be opened or closed at the top without the need for additional strings or ties. The instant invention addresses these long unmet needs by providing a superior plant protector. The instant device takes advantage of adroit placement of stress relief seals which act to form a basal annular ring providing enhanced structural support. A preferred embodiment of the instant device is shown in FIGS. 1–3, and described below.

Figure 1:
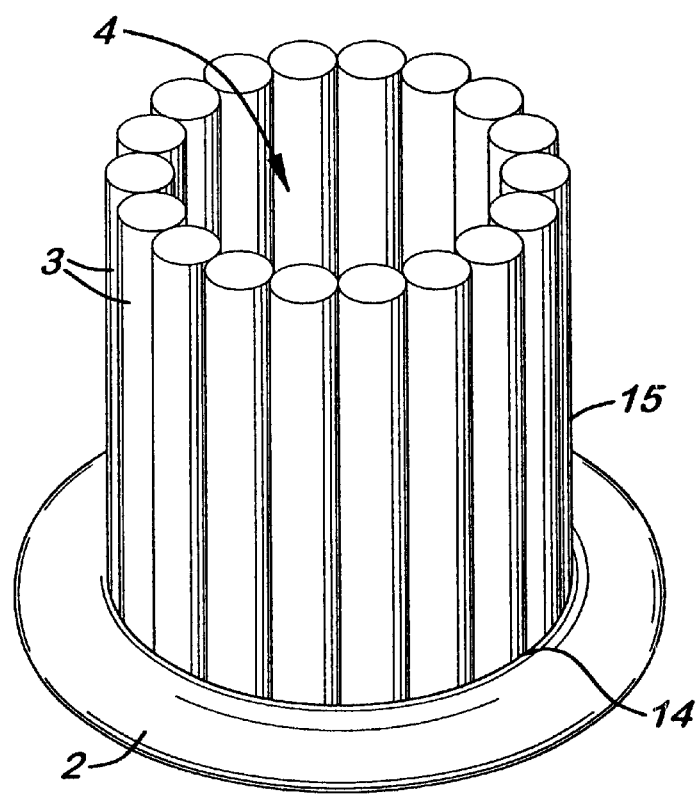
FIG. 1 is a perspective view of an embodiment of a fluid-filled, self-supporting plant protector constructed in accordance with the present invention.
Figure 2:
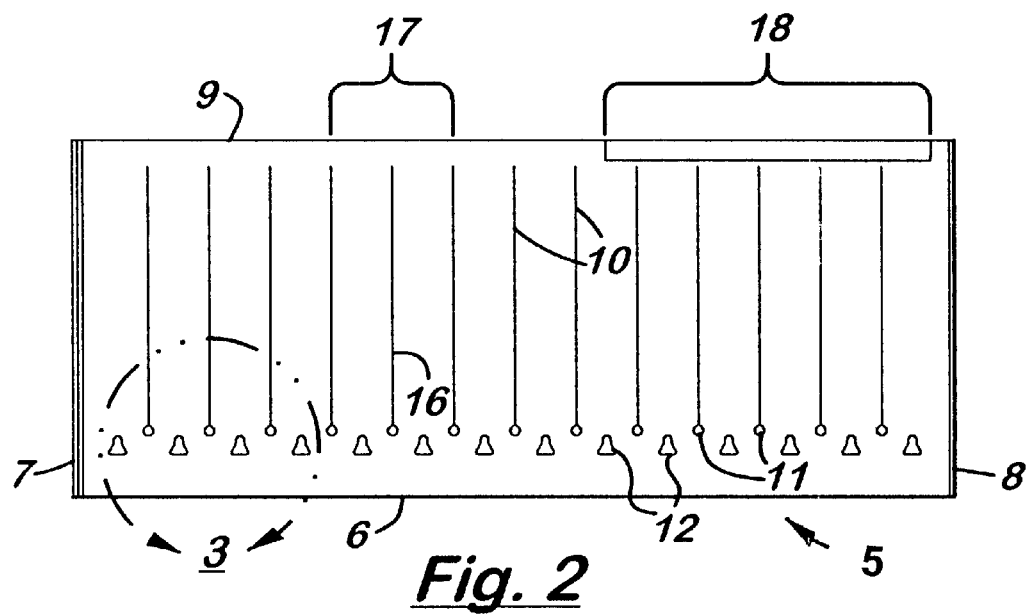
FIG. 2 is a side plan view an embodiment of the plant protector as it appears laying flat before being filled with fluid.
Figure 4:
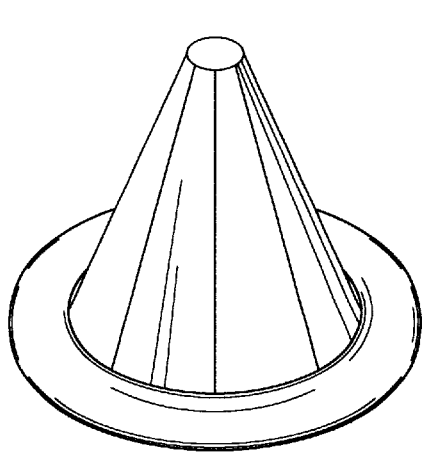
FIG. 4 is a perspective view of an embodiment of a fluid-filled, self-supporting plant protector in the closed position.
Figure 5:
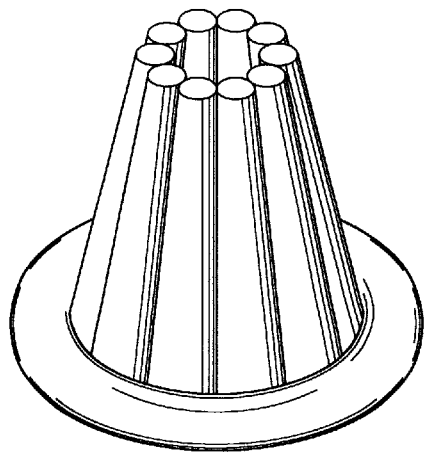
FIG. 5 is a perspective view of an embodiment of a fluid-filled, self-supporting plant protector wherein the vertical tubes are filled with fluid.

A preferred embodiment of the instant invention is shown in FIG. 1. A perspective view of the novel plant protector 1 is shown. The plant protector 1 is shown as filled or partially filled and disposed as it would be used in the field. The basal annular ring 2 is shown as filled with a fluid, preferably water. The vertical tubes 3 shown are deployed in the open position. When filled with fluid, the basal annulus 2 spreads radially and pulls open the base of the central opening 4 forming an inverted conical frustum (shown in FIG. 5). When filled only two-thirds full, the vertical tubes 3 may be pushed in to form a closed, inverted cone (shown in FIG. 4). The central opening 4, defined by the vertical tubes 3, is the area into which a plant (not shown) is received. As such, the plant is protected from mechanical breakage due to wind, animals, or other physical assaults. Furthermore, when the vertical tubes 3 are filled with water, the plant is protected from extreme temperatures.

The plant protector 1 is best described by reference to FIG. 2. A 40 inch×54 inch rectangular sheet of flexible material, such as low density polyethylene, is folded in half to form the two-layered rectangle 5 shown. The dimensions of the resulting rectangle 5 are 20 inches×54 inches. The base 6 of the rectangle 5 is formed by the crease of the fold described above. The sides 7 and 8 of the rectangle 5 are sealed from the top 9 of the rectangle 5 to the base 6 of the rectangle 5. The top 9 of the rectangle 5 remains open to accept fluid in the field. Seals 10, 11 and 12 are formed by heat sealing, adhesives, or similar means to form the vertical tubes 3. The seals 10 are spaced 3.5 inches apart from the sides 7 and 8 and each other. Each seal 10 ends at a stress relief seal 11 which enable the structure to withstand the stress applied when filled with water while at the same time optimizing flow dynamics to minimize filling time. Each stress relief seal 11 has a radius of 0.2 inches. Additional keyhole seals 12 are disposed between each stress relief seal 11 as shown. The location of the keyhole seals 12 is critical both to enable the structure to withstand the stress applied when filled with water while at the same time optimizing flow dynamics to minimize filling time, and to force the annular ring 2 into a disposition which maximizes stability of the plant protector 1. The keyhole seals 12 are 1 inch high×1.38 inches wide. All seals 11, 12 and 10 are of sufficient width to make a strong seal depending on the material used and type of seal made. The sides 7 and 8 are joined by heat sealing, adhesives, or similar means to form the tubular plant protector 1.

Figure 3:
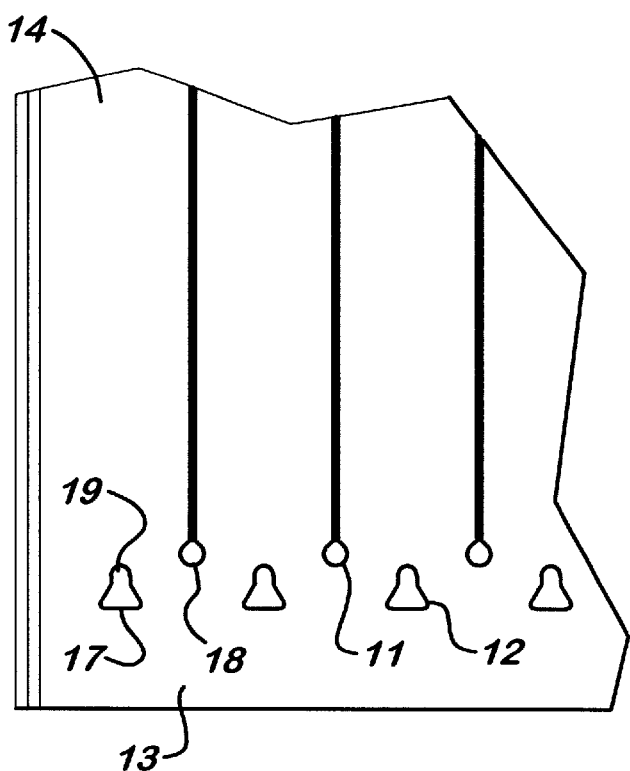
FIG. 3 is an enlarged detailed view of the portion of the plant protector encompassed by semi-circle A—A of FIG. 2.

As shown in FIG. 3, the annular ring 2 is defined by the space 13 existing between the sides 7 and 8, and below the seals 11 and 12. Fluid introduced into vertical tube 14 will first fill annular space 13 and then fill all vertical tubes 3 simultaneously. Because keyhole seals 12 are centered between stress relief seals 11, the annular ring 2, when filled with water or another fluid, is disposed such that the inner diameter 14 of annular ring 2 is equal to the outer diameter 15 of the large tube formed by vertical tubes 3. Such disposition gives the present invention improved radial and lateral stability. Preferably, the seals 11 and 12 defining the space 13 within the annular ring 2 are located as follows: the bottom 17 of each keyhole seal 12 is located 2.5 inches above the base 6 of the rectangle 5. The top 19 of each keyhole seal 12 is located 3.5 inches above the base 6 of the rectangle 5. The bottom 18 of each stress relief seal 11 is also located 3.5 inches above the base 6 of the rectangle 5.

Other embodiments of the present invention may be are best described with reference to FIG. 2. A particular seal 16 may be omitted thereby creating a single larger vertical tube 17 which is larger than the other vertical tubes 3. The single larger vertical tube 17 may be used to fill the plant protector 1 with water at a faster rate.

It is also envisioned that one layer of the polyethylene material may be partially cut away along the top 9 of the rectangle 5 as indicated by notch 18. Said notch 18 may extend along the entire length of the top 9 of the rectangle 5 thereby affording the user facile access to the opening which runs along the top 9 of the rectangle 5. Said notch 18 increases the ease of filling the plant protector 1.

The preferred method of using the present invention entails: placing the plant protector 1 around a plant such that annular ring 2 is located on the ground around the plant and the plant is enclosed within central opening 4. Water is introduced into one of the vertical tubes 3. Since all vertical tubes 3 are interconnected by annular ring 2, all vertical tubes 3 and annular ring 2 are filled as a result of introducing water into any one of the vertical tubes 3. The level of filling is determined as a function of the type of plant being protected and the ambient temperature in the vicinity of the plant. By filling vertical tubes 3 only two-thirds full, vertical tubes 3 may be pushed inward towards the center of central opening 4, thereby creating a closed, inverted conical structure (shown in FIG. 4) completely enclosing the plant. Said closed disposition provides enhanced thermal protection for the plant. By filling vertical tubes 3 more than two-thirds full, vertical tubes 3 automatically remain open providing slightly less thermal protection for the plant. The user determines the preferred disposition based upon prevailing weather conditions and the characteristics of the particular plant, and fills the vertical tubes 3 accordingly.

In view of the above it will be seen that the various objects and features of the invention are achieved and other advantageous results obtained. It should be understood that the description contained herein is illustrative only and is not to be taken in a limiting sense. Having thus described in detail certain preferred embodiments of the present invention, it is to be appreciated and will be apparent to those skilled in the art that many physical changes could be made in the apparatus and method without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A protective plant enclosure, comprising:

a plurality of substantially vertical elongated hollow container bodies of substantially equal height, said bodies having tops and bottoms, said bodies being open at said tops and said bottoms forming internal cavities therebetween, wherein;

said bodies are interconnected at said bottoms of said bodies by a substantially horizontal hollow annular ring in fluid communication with said bodies forming an internal cavity capable of receiving and holding a quantity of fluid therein, said ring having an inner and outer diameter, wherein;

said bodies form a continuous enclosure about an annular space defined by said inner diameter.

2. The enclosure of claim 1 wherein the container bodies are transparent.

3. The enclosure of claim 1 wherein the container bodies are translucent.

4. The enclosure of claim 1 wherein the internal cavity of one of the container bodies has a volume substantially larger than the volume of said remaining container bodies.

5. The enclosure of claim 1 wherein said container bodies further comprise inner and outer walls, said inner and outer walls having tops and bottoms, wherein said tops of said outer walls are slightly shorter than the tops of said inner walls.

6. A method of protecting plants comprising:

surrounding a plant with a plurality of substantially vertical elongated hollow container bodies of substantially equal height, said bodies having tops and bottoms, said bodies being open at said tops and said bottoms forming internal cavities therebetween, wherein;

said bodies are interconnected at said bottoms of said bodies by a substantially horizontal hollow annular ring in fluid communication with said bodies forming an internal cavity capable of receiving and holding a quantity of fluid therein, said ring having an inner and outer diameter, wherein;

said bodies form a continuous enclosure about an annular space defined by said inner diameter.

7. The method of claim 6 further comprising:

filling said internal cavities of said container bodies with a fluid.

8. The method of claim 7 further comprising:

completely filling said cavities such that said container bodies remain substantially vertical.

9. The method of claim 7 further comprising:

filling said cavities only about two-thirds full;

leaning said container bodies towards a center of said enclosure such that said tops of said container bodies form a closure means above said annular space.

* * * * *